United States Patent [19]

Mita

[11] Patent Number: 4,776,031

[45] Date of Patent: Oct. 4, 1988

[54] IMAGE READING APPARATUS

[75] Inventor: Yoshinobu Mita, Kawasaki, Japan

[73] Assignee: Canon Kabushiki Kaisha, Tokyo, Japan

[21] Appl. No.: 844,133

[22] Filed: Mar. 26, 1986

[30] Foreign Application Priority Data

Mar. 29, 1985 [JP] Japan .................................. 60-63786
Mar. 29, 1985 [JP] Japan .................................. 60-63787
Mar. 29, 1985 [JP] Japan .................................. 60-63788

[51] Int. Cl.⁴ .......................... G06K 9/28; H04N 1/24
[52] U.S. Cl. ...................................... 382/67; 358/163; 358/293
[58] Field of Search ............... 382/58, 65, 67, 55, 382/54, 44; 358/213, 212, 293, 285, 294, 162, 163; 250/578

[56] References Cited

U.S. PATENT DOCUMENTS

| | | | |
|---|---|---|---|
| 3,846,754 | 11/1974 | Oka et al. | 382/55 |
| 4,147,928 | 4/1979 | Crean et al. | 382/67 |
| 4,257,705 | 3/1981 | Hosoe et al. | 356/1 |
| 4,309,712 | 1/1982 | Iwakura | 346/76 |
| 4,377,820 | 3/1983 | Reitmeier | 358/163 |
| 4,470,065 | 9/1984 | Reitmeier | 358/163 |
| 4,527,199 | 7/1985 | Kinoshita et al. | 358/213 |
| 4,532,551 | 7/1985 | Kurata et al. | 382/44 |
| 4,566,788 | 1/1986 | Buczek | 250/578 |
| 4,586,082 | 4/1986 | Wilkinson | 358/163 |
| 4,590,520 | 5/1986 | Frame et al. | 358/163 |
| 4,630,307 | 12/1986 | Cok | 382/54 |
| 4,641,199 | 2/1987 | Miyagi | 358/285 |
| 4,675,533 | 6/1987 | Shimizu | 250/578 |
| 4,691,114 | 9/1987 | Hasegawa et al. | 250/578 |

Primary Examiner—Leo H. Boudreau
Attorney, Agent, or Firm—Fitzpatrick, Cella, Harper & Scinto

[57] ABSTRACT

An image reading apparatus has CCD line sensors, shift registers, a selector, and an arithmetic unit. Image data lost corresponding to joints in the CCD line sensors is interpolated using image data adjacent the lost data. The interpolation data is obtained by calculating the average values of the image data preceding and succeeding the lost data, and calculating the density gradient in the joint using the average values. The joint section can be divided into halves, and each half can be interpolated using image data near thereto. Original images can be reproduced with high precision without adverse influences of joints in the sensors.

28 Claims, 16 Drawing Sheets

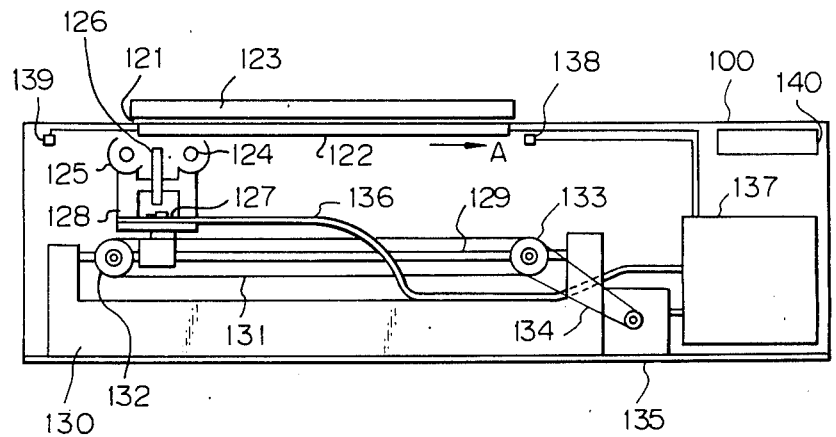

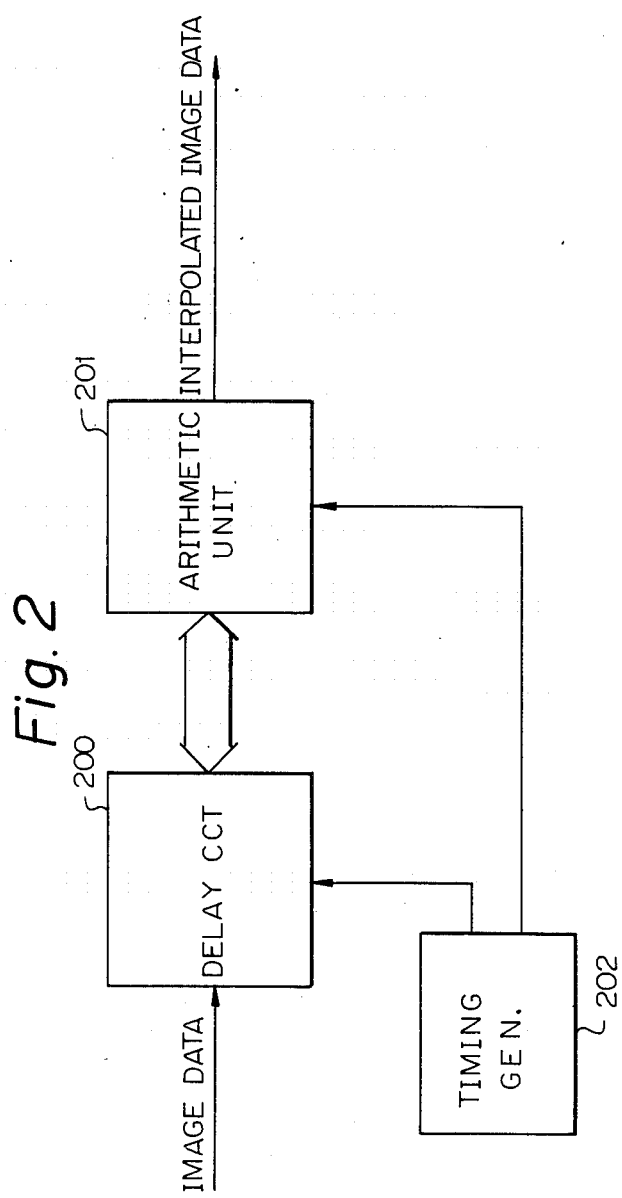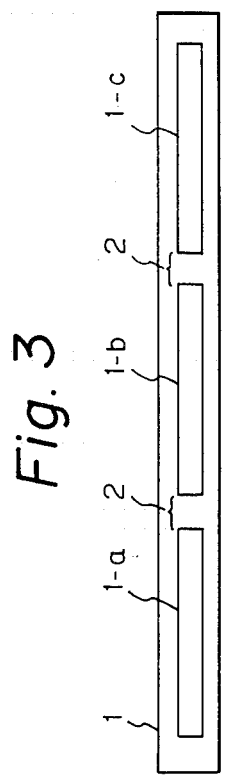

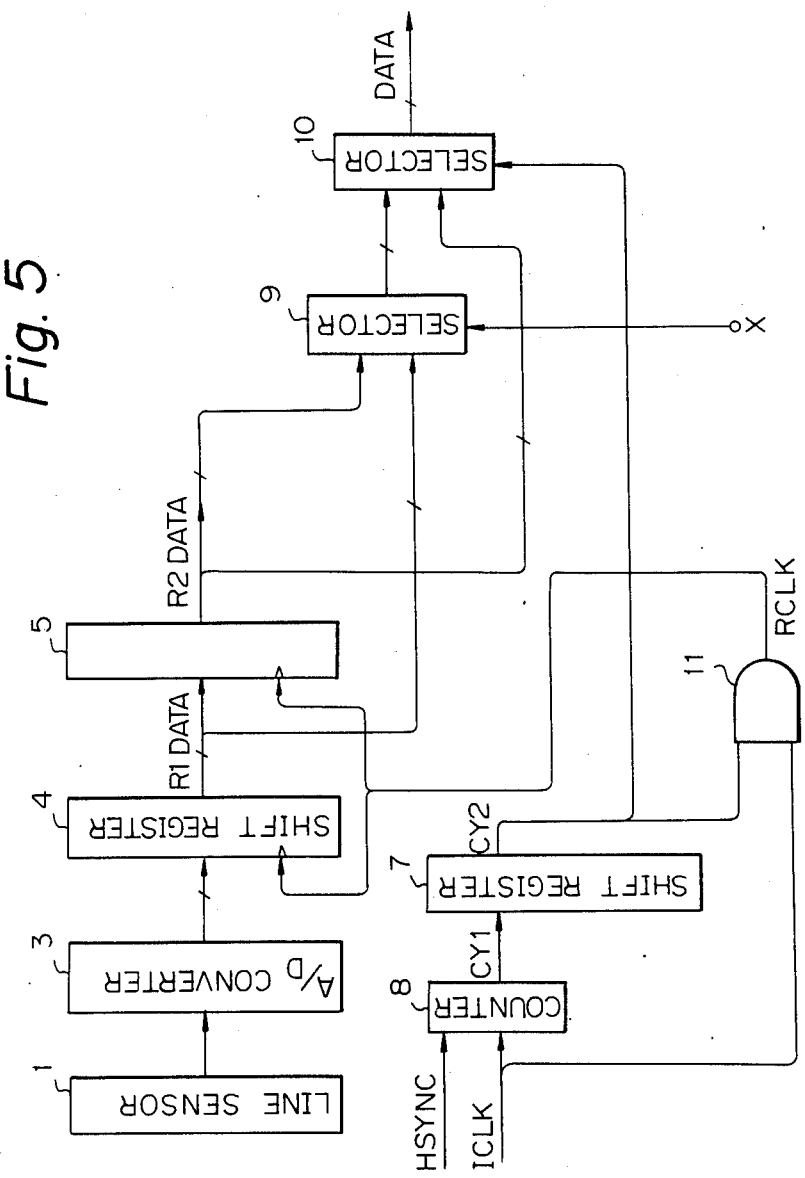

Fig. 9
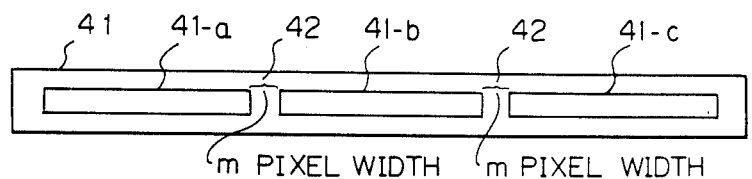
Fig. 10
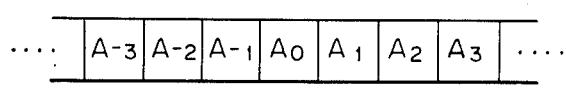
Fig. 19
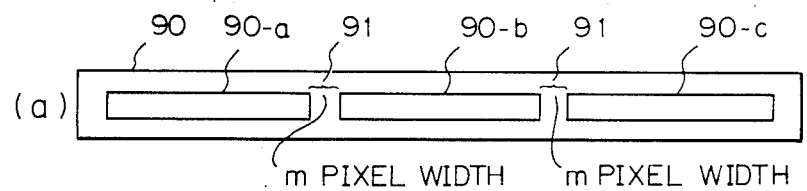
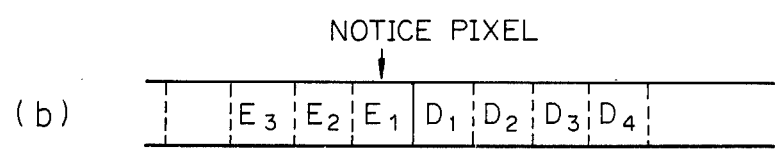
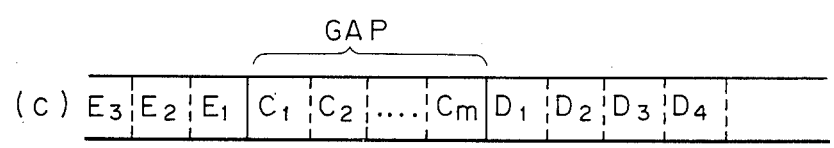

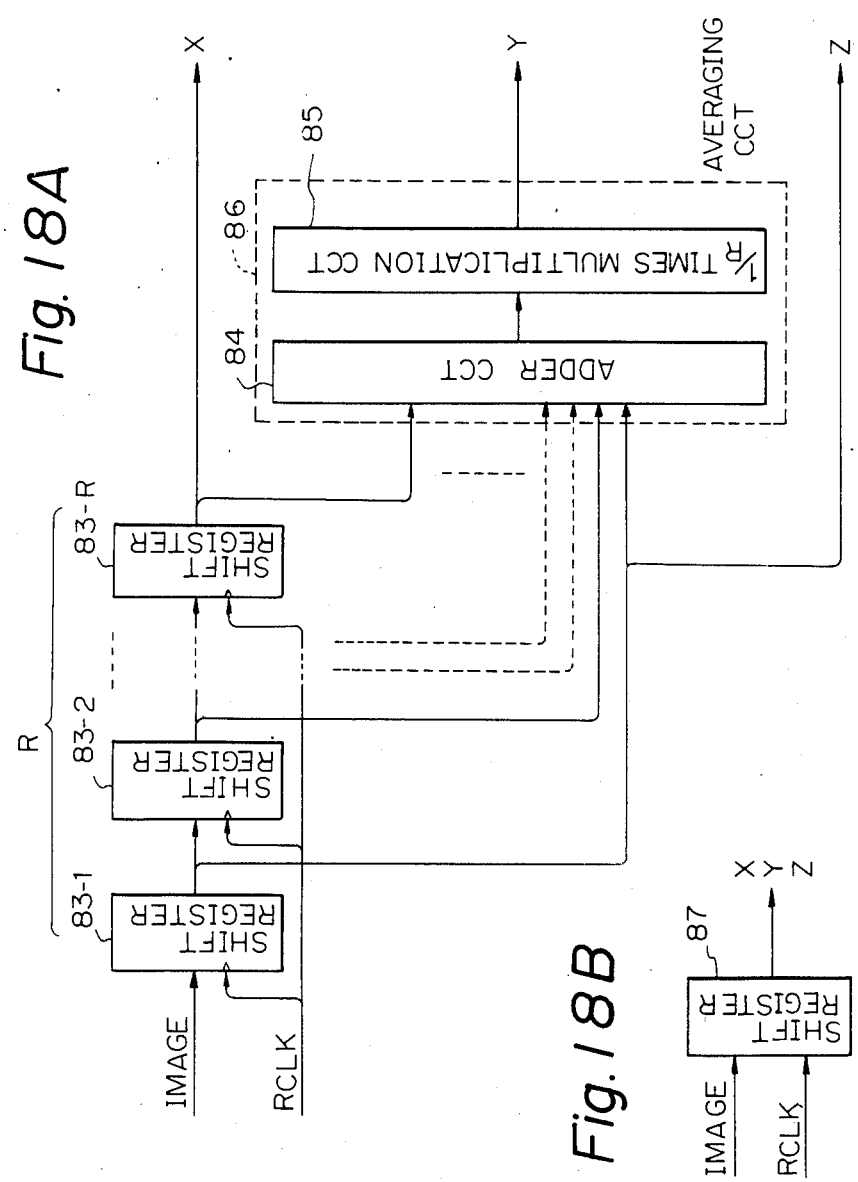

IMAGE READING APPARATUS

BACKGROUND OF THE INVENTION

1. Field of the Invention

The present invention relates to an image reading apparatus for reading an original image using an image sensor such as a CCD.

2. Related Background Art

In known line sensor, a plurality of light-receiving elements of amorphous silicon are aligned along a direction of width of an original so as to photoelectrically read the density of an original image. For example, when an original of A4 size is to be read in an equal size mode with a resolution of 16 pixels/mm along the longitudinal direction (about 300 mm) of the original, a single sensor with about 4,800 light-receiving elements on a 300 mm long substrate is required. However, it is difficult to form such a large number of light-receiving elements, without omissions, on a single substrate so as to provide uniform sensitivity. Therefore, unless the yield of such sensors is improved, practical line sensors cannot be fabricated at low cost.

In order to solve the above problem, line sensor chips each with about 1,000 light-receiving elements are aligned along a scanning direction, and one-line image is read divisionally by the respective line sensor chips. With this arrangement, the number of light-receiving elements to be formed on a single substrate is not so large, and the problems of improved yield and reduced cost can be solved to some extent.

It is, however, difficult to connect end portions of the light-receiving element arrays of the adjacent line sensor chips. When a plurality of line sensor chips are used to constitute a one-line sensor, non-readable regions are fomred.

In order to solve the above problem, a plurality of line sensors are arranged on a single substrate in a checkerboard manner. With this arrangement, nonreadable regions can be eliminated. However, read position error correction between adjacent sensor chips must still be performed.

SUMMARY OF THE INVENTION

It is an object of the present invention to provide an image reading apparatus for reading an image without omissions and without requiring complicated control.

It is another object of the present invention to provide an image reading apparatus for reading and reproducing a halftone image.

It is still another object of the present invention to provide an image reading apparatus for properly reproducing image data corresponding to gaps between a plurality of line sensors.

It is still another object of the present invention to provide an image reading apparatus for producing image data corresponding to a plurality of pixels in a gap between a plurality of line sensors without causing a density gap.

The above and other objects, features and advantages of the present invention will be apparent from the following description in conjunction with the accompanying drawings.

BRIEF DESCRIPTION OF THE DRAWINGS

FIG. 1 is a sectional view showing a system configuration of a reader unit employing the present invention;

FIG. 2 is a block diagram showing a basic arrangement of an image data processor according to a first embodiment of the present invention;

FIG. 3 is a schematic diagram showing a structure of an elongated read line sensor;

FIG. 4A is a table showing a notice pixel or a pixel of interest, and its adjacent pixels;

FIG. 4B is a table for explaining a method of forming interpolation data in a second embodiment;

FIG. 5 is a block diagram of a circuit according to the first embodiment of the present invention;

FIG. 9 is a schematic view showing a structure of a line sensor;

FIG. 10 is a data format of read image signals;

FIG. 18A is a detailed block diagram of a shift arithmetic unit;

FIG. 18B is a block diagram of a simplified shift arithmetic unit;

FIG. 19A is a schematic view of a CCD line sensor;

FIGS. 19B and 19C are data formats showing interpolation of data of a joint gap;

DETAILED DESCRIPTION OF THE PREFERRED EMBODIMENTS

Figure 6:
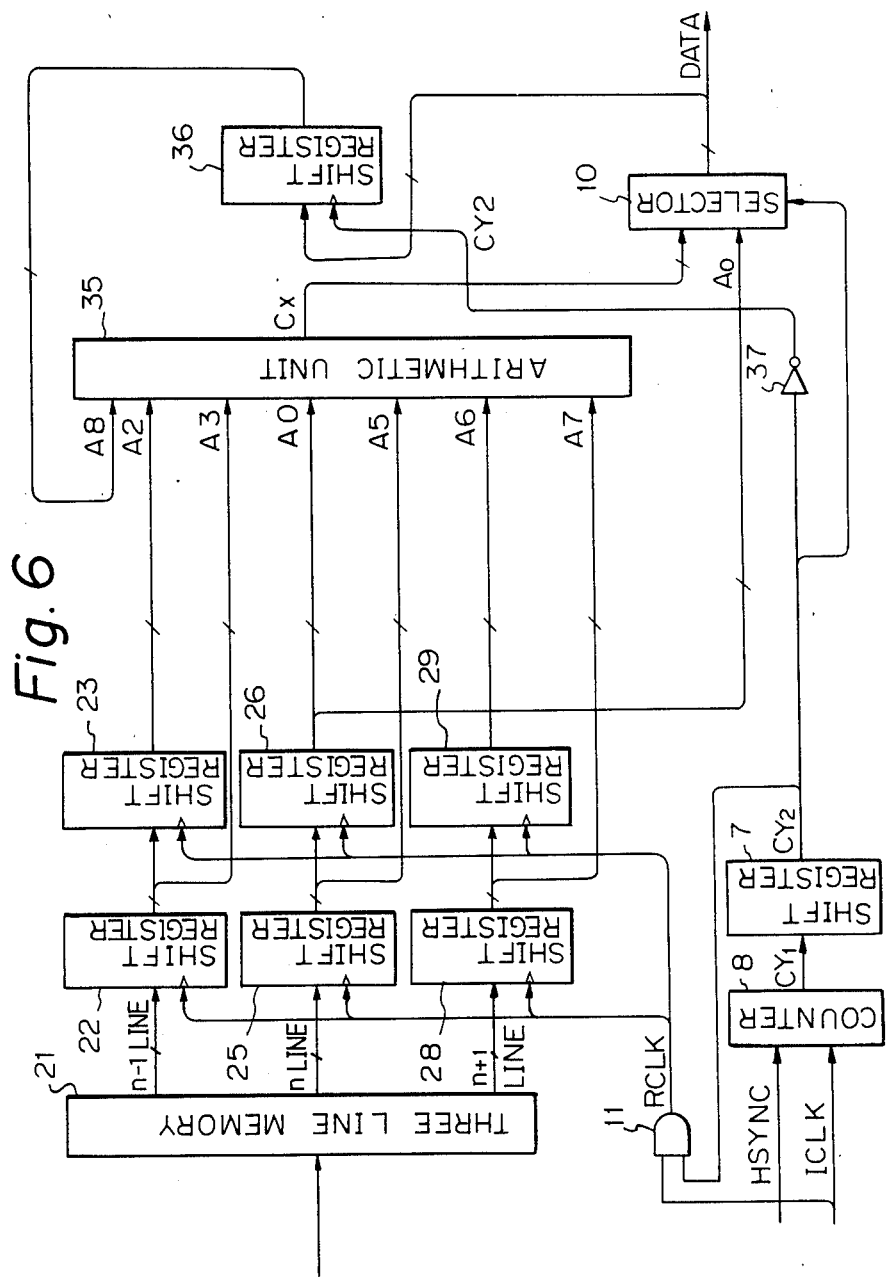
FIG. 6 is a block diagram of a circuit according to the second embodiment of the present invention.

Preferred embodiments of the present invention will be described in detail with reference to the accompanying drawings.

FIG. 1 schematically shows the system configuration of an image reading apparatus (a reader unit 100) employing the present invention. The components of the reader unit 100 will be described below. An original transparent glass table 122 supports an original 121. An original cover 123 is used to cover the glass table 122 after the original 121 is placed thereon. An illumination lamp 124 illuminates the original 121 on the table 122. A reflecting mirror 125 effectively guides light from the lamp 124 to the original 121. A short-focal length focusing lens 124 receives light reflected by the original 121. A CCD line sensor 127 converts a light image focused by the lens 126 into an electrical signal. The lamp 124, the reflecting mirror 125, the lens 126 and the CCD line sensor 127 are fixed on a stand 128 which can reciprocate. The stand 128 is held by a shaft 129. A base 130 fixes the shaft 129. A reciprocating force is transmitted to the stand 128 through a wire 131 and a roller 132. A driving roller 133 fixes the wire 131 and is connected to a rotational driving source. The driving source is connected to the driving roller 133 through a driving wire 134. The driving source is constituted by a motor 135. An output from the CCD line sensor 27 is transmitted through a cable 136.

The output from the CCD line sensor 127, and the operations of the lamp 124 and the motor 135 are controlled by a control processing unit 137. A forward limit switch 138 is operated upon reciprocal movement of the stand 128. A home position sensor 139 detects the home position of the stand 128. All inputs such as a copy command are entered at an operation panel 140.

The operation of the reader unit having the arrangement described above will be briefly described below. When a copy command is entered at the operation panel 140, a lamp ON signal is supplied from the control processing unit 137 to the lamp 124 to turn it on. The motor 125 is then rotated in the forward direction. The stand 128 is moved in the direction of an arrow A. The original 121 is scanned by the CCD line sensor 127 moving in the subscanning direction, so that each line of the light image can be read each time. One-line image data is converted to an electrical signal. When the stand 128 reaches an end of the forward path, the forward limit switch 138 is actuated and the motor 135 is rotated in the reverse direction. The stand 128 returns along the backward path. When the stand 128 actuates the home position sensor 129, it stops at the home position.

FIRST EMBODIMENT

The basic arrangement of an image data processor, in the control processing unit 137 of FIG. 1, for processing image data from the line sensor is illustrated in FIG. 2.

Referring to FIG. 2, in the image reading apparatus having an image input sensor with solid-state image pickup devices connected to each other, omitted image data corresponding to the joints between the solid-state image pickup devices is produced using image data of adjacent pixels, thereby properly reproducing an original image.

The image data processor includes a delay circuit 200, an arithmetic unit 201 and a timing generator 202.

With this arrangement, the delay circuit 200 simultaneously supplies image data of a plurality of adjacent pixels to the arithmetic unit 201. The arithmetic unit 201 calculates the adjacent image data according to a predetermined algorithm at timings corresponding to joints generated by the timing generator 202, and outputs interpolated image data.

FIG. 3 schematically shows a CCD line sensor. The CCD line sensor includes a main body 1, and line sensor chips 1-a, 1-b and 1-c. The line sensor chips are aligned with gaps 2 in line on a single ceramic substrate. The gap as a width corresponding to about one pixel. When an image is read by this CCD line sensor, image data of the original in each gap 2 is lost.

FIG. 4A shows pixels adjacent to the notice pixel A0 when pixel data read by the sensor 1 is aligned in the main scanning and subscanning direction. In this case, the data in the joint between the adjacent line sensor chips is lost, and data to compensate for the lost data is defined as "interpolation data", "Interpolation data" is inserted between pixels A2 and A3, between pixels A0 and A5, and between pixels A6 and A7. The first embodiment will be described in detail below.

FIG. 5 is a block diagram of a circuit of the first embodiment. A line sensor 1 has a plurality of line sensor chips each consisting of solid-state image pickup devices such as CCDs. An output from the line sensor 1 is quantized by an A/D converter 3 to image data of a plurality of bits an A/D converter 3 to image data of a plurality of bits representing the density of each pixel. The quantized image data is sequentially transferred to shift registers 4 and 5 in response to read clocks RCLK. If the shift registers 4 and 5 comprise one-pixel delay elements, outputs R1DATA and R2DATA therefrom represent image data of horizontally adjacent pixels. In this embodiment, read timings are determined such that the output R2DATA represents the notice pixel.

When the notice pixel data R2DATA represents the pixel A0 of FIG. 4A, the output R1DATA from the shift register 4 represents the pixel A5 of FIG. 4A. At a timing when the notice pixel is represented by the "interpolation data", the image data of the adjacent pixels A0 and A5 are output from the shift registers 5 and 4 and are simultaneously input to a selector 9. One of the inputs to a selector 10 is the output R1DATA or R2DATA selected by the selector 9. The other input to the selector 10 is R2DATA. When a selection input $CY_2$ to the selector 10 does not indicate joint data, the selector 10 selects R2DATA. However, the selector 10 selects the output from the selector 9 when the input $CY_2$ indicates joint data.

In accordance with an input at an X terminal, the selector 9 determines an the correction data one of the image data of the pixels A0 and A5 adjacent to the notice pixel when the notice pixel data R2DATA is the "interpolation data". One of the outputs of the pixels adjacent to the notice pixel is output from the selector 9 and is input to the selector 10.

As described above, the notice pixel data R2DATA as the output from the shift register 5 is also directly supplied to the selector 10. The selector 10 outputs R2DATA while the timing signal $CY_2$ is set at logic "1". However, the selector 10 selects the output of the selector 9 as the "interpolation data" while the timing signal $CY_2$ is set at logic "0".

A counter 8 has a count period corresponding to a number larger than the number of bits of the line sensor 1-a, 1-b, or 1-c of FIG. 3. The counter 8 is started in response to a horizontal sync signal HYSYNC. When the count period has elapsed, the counter 8 outputs a signal $CY_1$ ($CY_1$ is set at low level="0"). The signal $CY_1$ is delayed by a shift register 7. The delayed signal is synchronized with the notice pixel data and is output as the signal $CY_2$. The signal $CY_2$ represents a timing for the "interpolation data". The "interpolation data" timing corresponds to nonshifting of the shift registers 4 and 5. For this purpose, the signal $CY_2$ and an image transfer clock ICLK are logically ANDed by an AND gate 11 to interrupt the output of RCLK, so that some pulses are omitted in the signal RCLK, as shown in the timing chart of FIG. 7. The signal RCLK is supplied to the shift registers 4 and 5. In this manner, when the notice pixel data represents the "interpolation data", the shift registers 4 and 5 are disabled.

The "interpolation data" is inserted between pixels A0 and A5 in response to the output $CY_2$ from the shift register 7. At the same time, a value of the "interpolation data" is selected from one of the data of the adjacent image data in response to the selection terminal input X to the selector 9.

Figure 7:
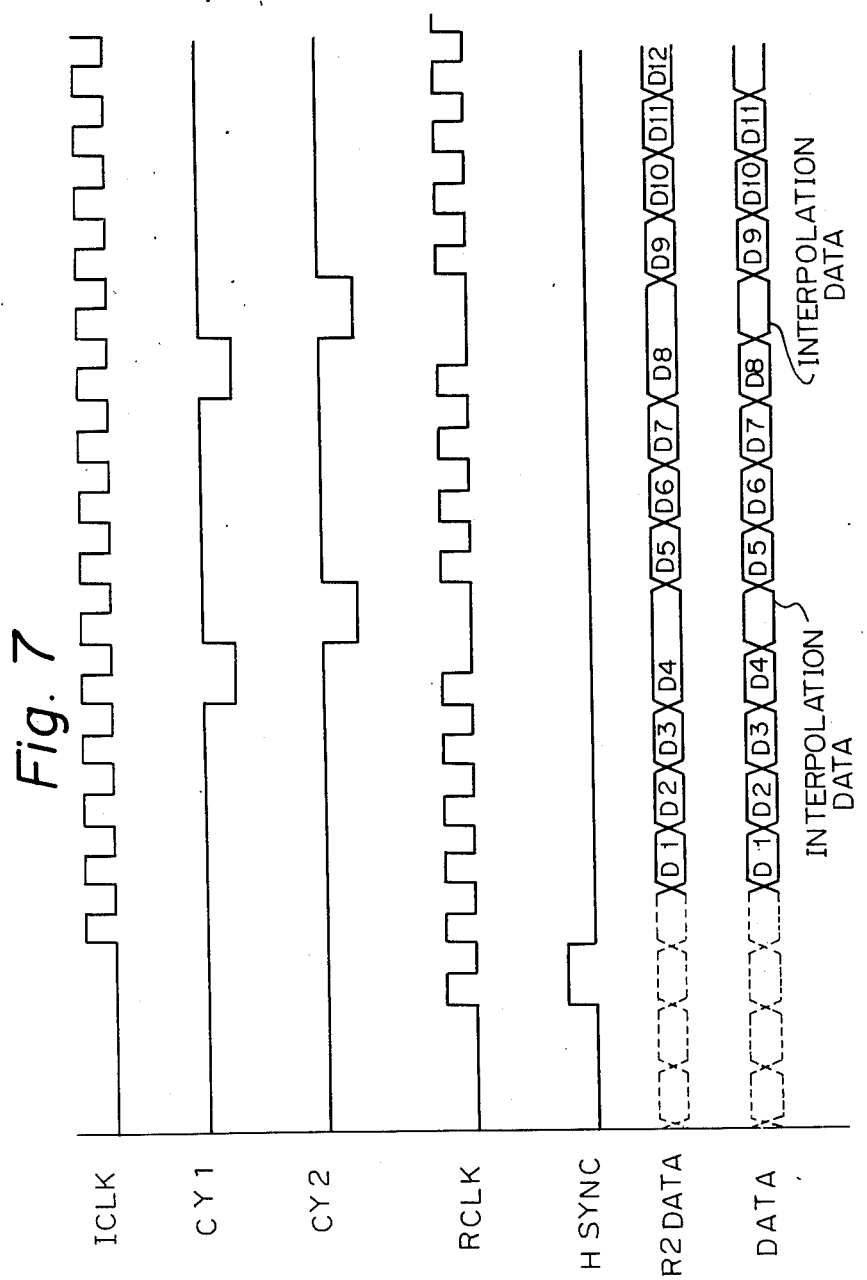
FIG. 7 is a timing chart for explaining the operation of the first embodiments.

FIG. 7 is a timing chart corresponding to the above description when the number of bits of each of the CCD line sensor chips 1-a, 1-b, and 1-c is 4. In practice, the number of bits of each line sensor chip is several hundreds to several thousands. The counter 8 outputs the signal $CY_1$ at periods of every five clocks after it receives the signal HSYNC. The signal $CY_2$ is then output at a timing delayed by one clock from the signal $CY_1$. In this case, the output from the shift register 5 is given as R2DATA in FIG. 7, and the interpolation result of the "interpolation data" is DATA in the timing chart. The "interpolation data" is the data of the right or left adjacent pixel in accordance with the logic level of the terminal X of FIG. 5. For example, if X="0", the image data of the left adjacent pixel is selected as the "interpolation data". However, if X="1", the image data of the right adjacent pixel is selected as the "interpolation data". The data of the right or left adjacent pixel is used as the "interpolation data" for the gap (joint) between the adjacent line sensor chips.

SECOND EMBODIMENT

FIG. 6 is a block diagram of a circuit according to a second embodiment of the present invention. Unlike the first embodiment wherein the image data of the right or left pixel adjacent to the joint is selected as the "interpolation data", the "interpolation data" is calculated by referring to data of seven adjacent pixels in the second embodiment, as shown in FIG. 4B.

Referring to FIG. 6, an input section of a 3-line memory 21 receives an A/D-converted signal derived from an output from the line sensor. The image data of three lines stored in the 3-line memory 21 is simultaneously supplied to shift registers 22, 25 and 28. The signals input to these registers are (n−1)th line data, nth line data including the notice pixel data, and (n+1)th line data next to the line including the notice pixel, respectively.

The signals input to the shift registers 22, 25, and 28 are transferred to shift registers 23, 26, and 29 in response to clocks RCLK, respectively. An output from the shift register 26 is defined as an output of the notice pixel. If this output corresponds to the pixel A0 of FIG. 4A, outputs from the shift registers 22, 23, 25, 26, 28 and 29 correspond to image data A3, A2, A5, A0, A7, and A6 of FIG. 4A, respectively. The outputs A3, A2, A5, A0, A7, and A6 from the shift registers 22, 23, 25, 26, 28 and 29 are supplied to an arithmetic unit 35. In this embodiment, the (n−1)th line "interpolation data" of pixel A8 stored in a shift register 36 is also supplied to the arithmetic unit 35. FIG. 4B shows an interpolation method therefor. A0, A2, A3, A5, A6 and A7 are pixel data read by the line sensor 1; A8 is the "interpolation data" interpolated by the previous line; and CX is the "interpolation data" to be interpolated. The arithmetic unit 35 performs arithmetic operation of the "interpolation data" using the data of the seven pixels around the notice pixel. The resultant data is supplied to a selector 10. The selector 10 has the same function as that of the first embodiment. The selector 10 receives the correction data of the "interpolation data" and the data of the notice pixel A0. When the notice pixel data is determined not to represent the "interpolation data" according to the value of the output $CY_2$ from the shift register 7, the data of the notice pixel A0 is output from the selector 10. The operations of a counter 8, a shift register 7, the selector 10, and an AND gate 11 are the same as those of the first embodiment, and a detailed description thereof will be omitted.

When the notice pixel data represents the "interpolation data", the arithmetic unit 35 receives the data of the adjacent pixels A2, A3, A0, A5, A6 and A7, as shown in FIG. 4A and calculates the "interpolation data". Referring to FIG. 4B, A8 represents the interpolation data of the previous line and is derived using the correction data. The "interpolation data" is output from the shift register 36. The shift register 36 receives a signal obtained after the signal $CY_2$ representing a section excluding the "interpolation data" duration is inverted by an inverter 37. The interpolation data is shifted and transferred to the shift register 36 at the leading edge of the signal $CY_2$. Since the shift register 36 has a capacity of the "interpolation data" of one sensor, the shift register 36 outputs the "corresponding interpolation data" for the next line "interpolation data".

The arithmetic unit 35 performs the following arithmetic operation:

$$CX = (A3 \cdot B3 + A2 \cdot B2 + A0 \cdot B0 + A5 \cdot B5 + A6 \cdot B6 +$$
$$A7 \cdot B7 + A8 \cdot B8)/(B3 + B2 + B0 + B5 + B6 + B7 + B8)$$

for B3, B2, B0, B5, B6, B7, B8 $\geq$ 0, where Bn is a weighting coefficient and is exemplified as follows:
(1) B3=B2=B0=B5=B6=B7=B8=1
(2) B3=B2=B0=B5=B6=B7=1, and B8=0
(3) B0=1, and B3=B2=B5=B6=B7=B8=0
(4) B0=B5=1, and B3=B2=B6=B7=B8=0

As is apparent from the above description, the "interpolation data" is determined according to the logic levels of the seven adjacent pixels.

As described with reference to the first and second embodiments, when the line sensor comprises several chips and joints are present between the adjacent chips, the above-mentioned "interpolation" is performed to easily obtain an elongated line sensor. Furthermore, by interpolating the image signals of multiple gradation levels by using the "interpolation data", proper image reproduction can be performed. The "interpolation data" is produced in accordance with analog image data prior to conversion into digital image data. Therefore, the subsequent image processing such as edge emphasis processing can be properly performed.

As described above, lost image data corresponding to the joints of the series-connected solid-state image pickup devices can be optimally interpolated, and the original image can be reproduced with high precision.

In the first and second embodiments, the joint of each two adjacent line sensor chips is a one-pixel portion. However, when each joint corresponds to a plurality of pixels and these pixels are interpolated using the same data, a gap of the image density level occurs in the joint.

An interpolation operation for solving the above drawback will be described hereinafter.

THIRD EMBODIMENT

Figure 8:
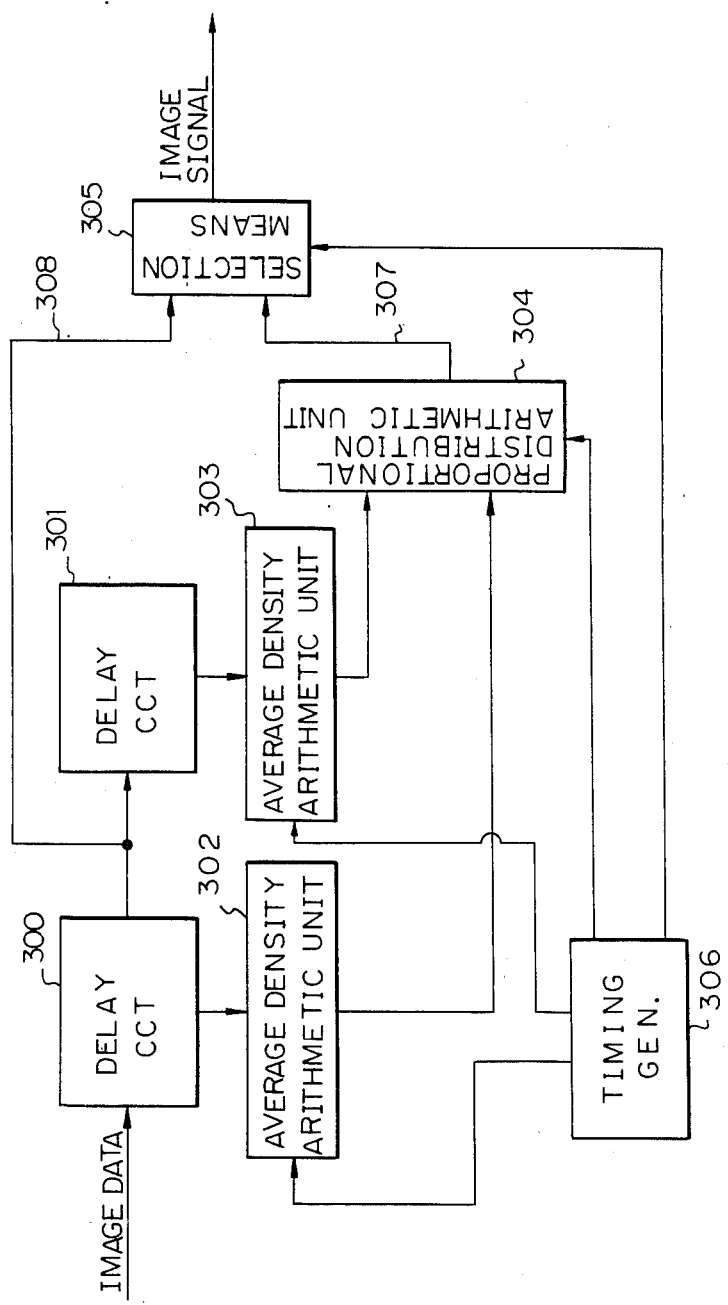
FIG. 8 is a block diagram showing a basic arrangement of an image data processor according to a third embodiment of the present invention.

A third embodiment of the present invention is shown in FIG. 8. Referring to FIG. 8, in an image reading apparatus having an image input sensor obtained by coupling a plurality of image pickup devices at intervals corresponding to at least two pixels, average densities of the image data within effective pixel sections including at least one pixel connected to the leading and trailing ends of the joint are calculated. A density gradient within the joint is calculated from the two average densities, and the lost image data in the joint between the adjacent image pickup devices is interpolated using the density gradient, thereby properly reproducing an original image.

A basic arrangement of the third embodiment is illustrated in FIG. 8. This circuit comprises delay circuits 300 and 301, average density arithmetic units 302 and 303 for the delay circuits 300 and 301, a proportional distribution arithmetic unit 304, an image signal selection means 305, and a timing generator 306 for generating a joint timing signal.

In this embodiment, the proportional distribution arithmetic unit 304 calculates a proportional distribution density 307 obtained by proportionally distributing the average densities from the units 302 and 303 to the pixel positions within the joint. The proportional distribution density 307 is supplied to the selection means 305. The selecting means 305 selects image data 308 of the delay circuit 300 as the image signal in response to a timing signal from the timing generaor 306 when the notic pixel data does not represent the joint data. Otherwise, i.e., when the notic pixel data represents the joint data, the selection means 305 selects the proportional distribution density 307 as the image signal.

The third embodiment will be described in detail below. FIG. 9 shows a structure of a line sensor used in the image reading apparatus of this embodiment. An image reading section 41 consists of a plurality (three in this embodiment) of solid-state image pickup devices (line sensor chips) 41-a, 41-b and 41-c such as CCDs. A gap between the adjacent solid-state image pickup devices corresponds to m pixels. A continuous image signal can be obtained by single scanning while the line sensor 41 is scanned along the subscanning direction. In this case, image signals of m pixels corresponding to the joints are lost.

Referring to FIG. 10, if the joint corresponds to a gap between image signals A−1 and A0, m-pixel image data must be restored and inserted between the image signals A−1 and A0. The image data to be restored can be obtained by the following method.

Figure 11:
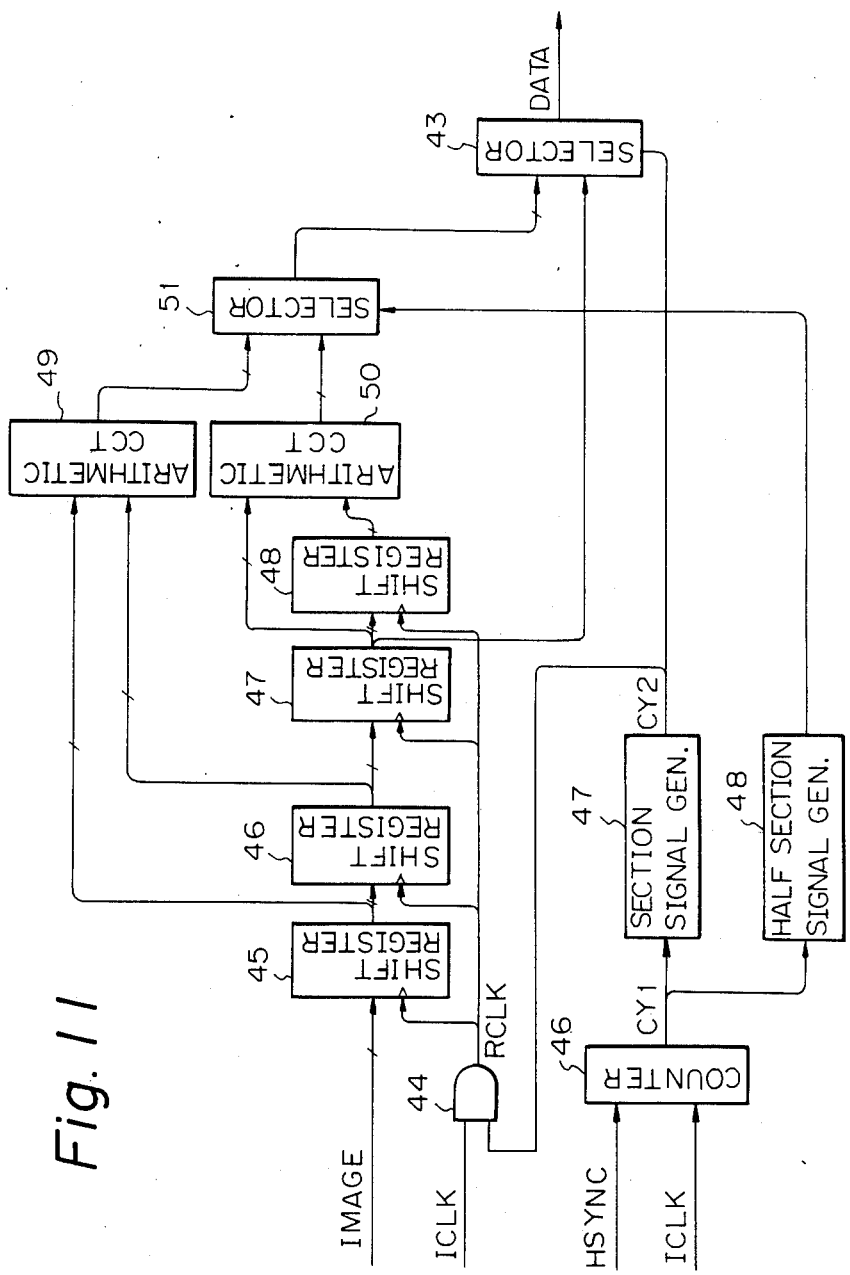
FIG. 11 is a block diagram of a circuit of the third embodiment of the present invention.

FIG. 11 is a block diagram of the third embodiment. A signal IMAGE is quantization data of a plurality of bits representing the density of each pixel. In this case, the quantization data is obtained by A/D-converting an output from the CCD line sensor. The image data IMAGE is supplied to a shift register 45 and is transferred to shift registers 46, 47 and 48 in response to a signal RCLK. If an output from the shift register 47 represents the notic pixel A0 of FIG. 10, outputs from the shift registers 45, 47 and 48 correspond to pixels A−1, A1 and A2, respectively.

A counter 46 has a count period corresponding to the same number of pixels of each of the line sensor chips 41-b and 41-c of FIG. 9. When the count period has elapsed, the counter 46 outputs a count-up signal $CY_1$. The count-up signal $CY_1$ is supplied to a section signal generator 47 and a half section signal generator 48. The sectional signal generator 47 generates a signal of logic "0" for a period corresponding to m-pixel joint in response to the count-up signal $CY_1$. Similarly, the half section signal generator 48 generates a signal of logic "0" for a period of $\frac{1}{2} \times m$. An output $CY_2$ from the section signal generator 47 is supplied to an AND gate 44. Since the AND gate 44 also receives an image transfer clock ICLK, the signal RCLK is output when the signal $CY_2$ is set at logic "1". However, at the joint timing, the signal $CY_2$ is set at logic "0" for the period corresponding to m pixels, and the signal RCLK is not output. The signal RCLK is supplied as shift clocks of the shift registers 45, 46, 47 and 48.

Figure 12:
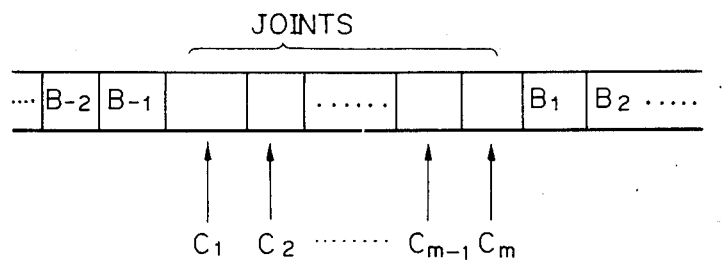
FIG. 12 is a data format showing a joint section of the line sensor.

Assume that an output from the shift register 47 is the notic pixel. This output is supplied to a selector 43. At the nonjoint timing, the selector 43 selects the output (i.e., the notic pixel data) from the shift register 47 since the section signal generator output $CY_2$ is set at logic "1". However, at the joint timing, the signal $CY_2$ is set at logic "0" and the signal RCLK is also kept at logic "0". Therefore, the shift registers 45 to 48 are disabled and held in the states after the shift registers 45 and 46 and the shift registers 47 and 48 have outputted the data of pixels preceding the notic pixel and the data of pixels following the notic pixel, respectively. As shown in FIG. 12, if Cl to Cm are given as joint image data to be interpolated, the data preceding the notic pixel corresponds to B−1 and B−2, and the data following the notic pixel corresponds to B1 and B2. During joint correction, A−1, A0, A1 and A2 of FIG. 10 correspond to B−2, B−1, B1 and B2, respectively.

Outputs from the shift registers 45, 46 and the shift registers 47 and 48 are supplied to arithmetic circuits 49 and 50, respectively. Outputs from the arithmetic circuits 49 and 50 serve as data inputs to a selector 51. the selection input to the selector 51 is the output from the half section signal generator 48. The output from the half section signal generator 48. The output from the half section signal generator 48 is set at logic "0" for the first half section and logic "1" for the second half section. The selector 51 selects the output from the arithmetic circuit 50 for the first half section and the output from the arithmetic circuit 49 for the second half section. The selected output is supplied to the selector 43 and is selected thereby for the joint section when the signal $CY_2$ is set at logic "0".

The counter 46 is disabled by a logic (not shown) when the signal $CY_2$ is set at logic "0". However, when the signal $CY_2$ goes to logic "1", the counter 46 counts one line sensor chip width.

When the outputs from the shift registers 46 and 47 are produced without arithmetic operation of the arithmetic circuits 49 and 50, the circuit of FIG. 11 corresponds to a system using the most adjacent image data as the joint correction data. The image data of B−1 is used for pixels C1 to Cm/2 of the joint section, and the image data of B1 is used for pixels Cm/2+1 to Cm of the joint section. If m is an odd number, the remainder of m/2 is rounded off or up.

The arithmetic circuits 49 and 50 are exemplified as arithmetic circuits for outputting an average value of the outputs from the shift registers 45 and 46 and an average value of outputs from the shift registers 47 and 48. In this case, the circuit in FIG. 11 is equivalent to a circuit for using an average value of the image data of the most adjacent two pixels as the joint section correction data. That is, C1 to Cm/2=(B−2+B−1)/2

Cm/2+1 to Cm=(B2+B1)/2 if m=2, the data of each adjacent pixels serves as the joint pixel data.

FOURTH EMBODIMENT

Figure 13:
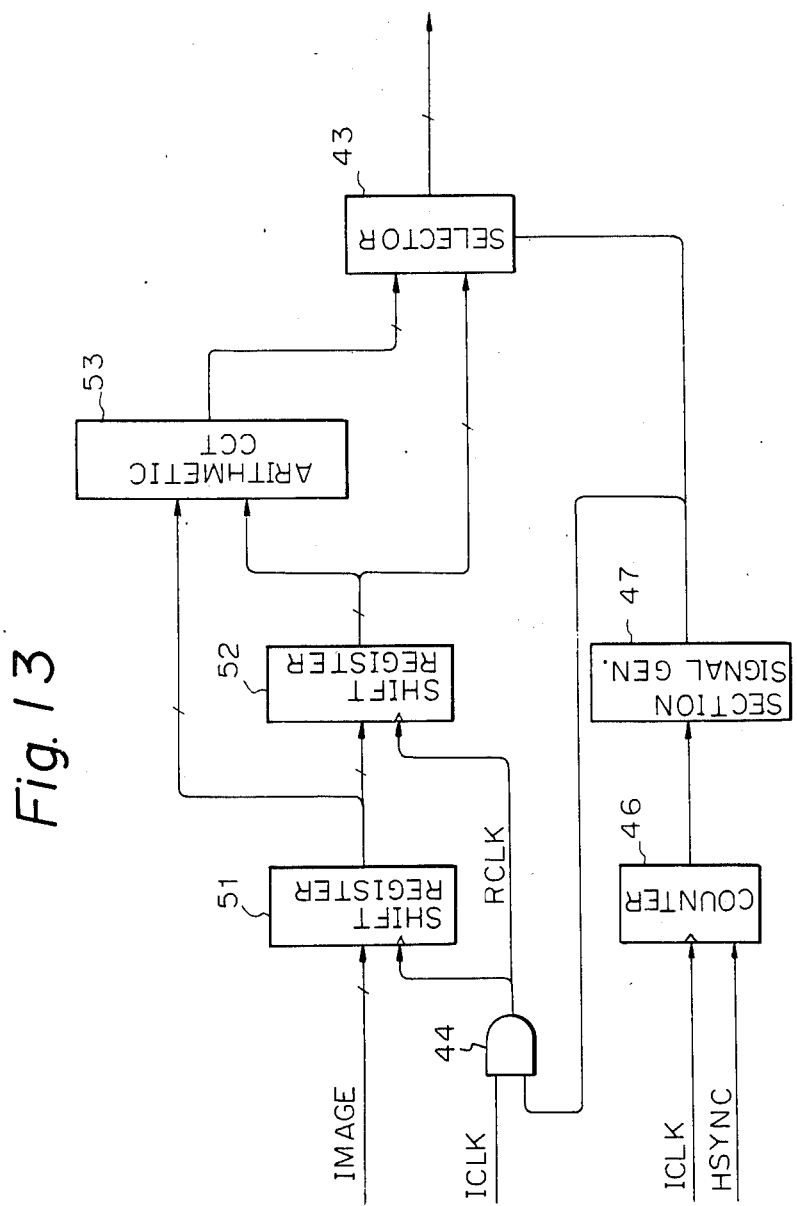
FIG. 13 is a block diagram of an image data processor according to a fourth embodiment of the present invention.

FIG. 13 is a block diagram of a fourth embodiment. A counter 46, a section signal generator 47, and an AND gate 44 in FIG. 13 will not be described since they are the same as those of the third embodiment.

Referring to FIG. 13, image data IMAGE is supplied to a shift register 51 and is transferred to a shift register 52 in response to a signal RCLK. An output from the shift register 52 is normally data of the notic pixel. For the joint section, the signal RCLK is disabled, as previously described, and the shift registers 51 and 52 are stopped. At this time, an arithmetic circuit 53 receives outputs from the shift registers 52 and 51 for holding image data preceding and following a joint.

The arithmetic operation of the arithmetic circuit 53 will be described. An output of the shift register 52 is subtracted from the output of the shift register 51, and the difference is divided by (m+1). Although not shown, the quotient is added to the output from the shift register 52 in response to the image transfer clock ICLK. The sum is output from the arithmetic circuit 53. A shown in FIG. 12, pixels C1 to Cm correspond to a joint section, the immediately preceding pixel is B−1 and the immediately succeeding pixel is B1. The nth interpolation image data Cn between C1 and Cn is derived from the following calculation:

$$Cn = B-1 + n \cdot (B1-B-1)/(m+1)$$

Figure 21:
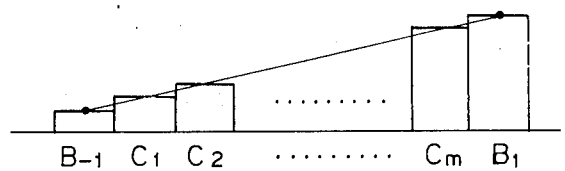
FIGS. 21 and 22 are diagrams showing reproduced interpolation image data of the joint section.

The selector 43 is operated in the same manner as in the third embodiment. The selector 43 is controlled in response to an output from the section signal generator 47 in the joint section and outputs the data Cn at the joint bit. The image data after interpolation is shown in FIG. 21.

FIFTH EMBODIMENT

Figure 14:
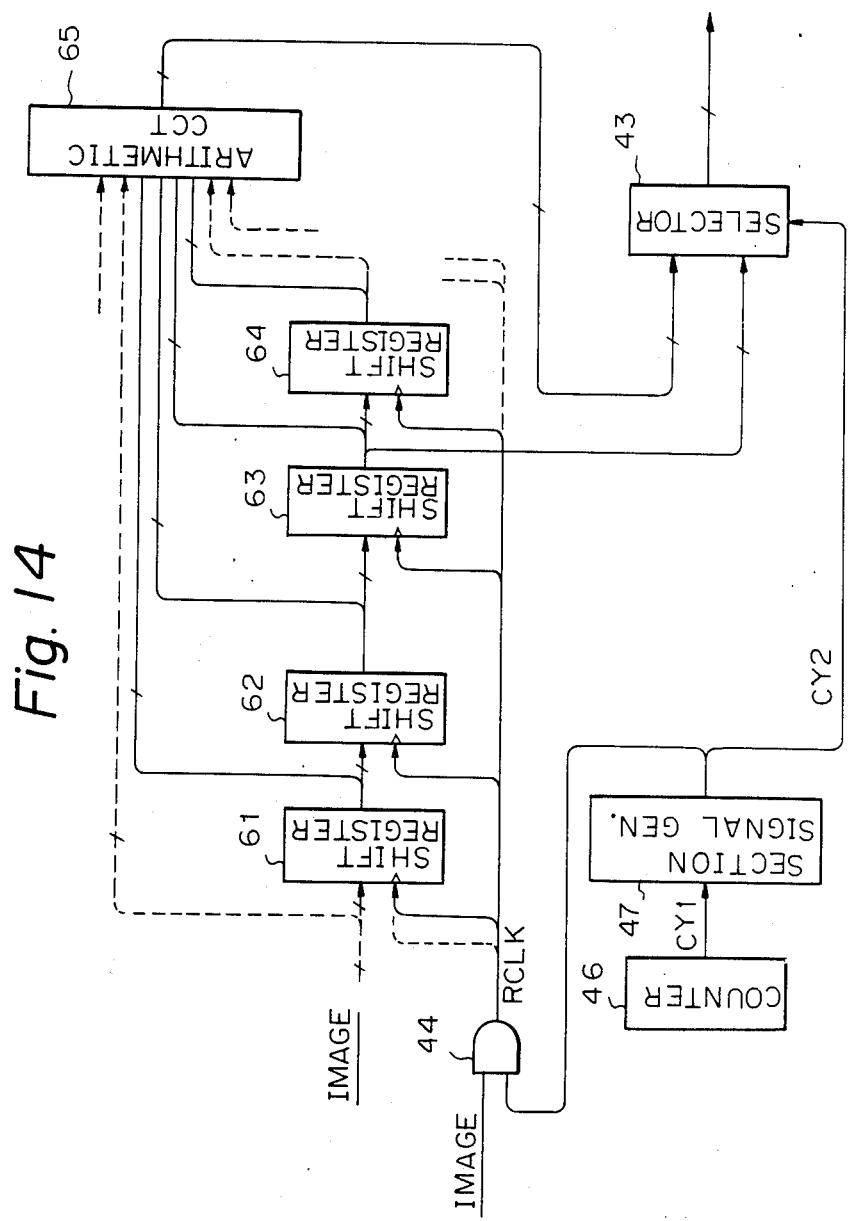
FIG. 14 is a block diagram of an image data processor according to a fifth embodiment of the present invention.

FIG. 14 is a block diagram of a fifth embodiment. A counter 46, a section signal generator 47, and an AND gate 44 in FIG. 14 will not be described since they are the same as those of the third embodiment.

Image data IMAGE is transferred to shift registers 61, 62, 63 and 64. The shift clock for these registers is the signal RCLK described also with reference to the third embodiment. The signal RCLK is disabled during joint image data transfer. At this time, image data signals corresponding to B−1 and B−2 (FIG. 12) are output from the shift registers 63 and 64, respectively. Image data signals corresponding to B1 and B2 are output from the shift registers 62 and 61. These signal outputs are supplied to an arithmetic circuit 65. An arithmetic operation result of the arithmetic circuit 65 is supplied to a selector 43. The arithmetic operation result is output from the selector 43 in a joint section in response to the value of an output $CY_2$ from the section signal generator 47. Otherwise, the output (i.e., the notic pixel output) from the shift register 63 is output from the selector 43.

The arithmetic circuit 65 performs the following arithmetic operation.

Arithmetic Operation (1):

$$Cn = \{(n+0.5)(B1+B2)/2 + (m-n+1.5)(B-1+B-2)/2\}/(m+2)\}$$

Arithmetic Operation (2):

$$Cn = \{B-1 + n \cdot (B1-B-1)/(m+2)\}$$

or $$Cn = \{n \cdot B + (m-n+1)/(m+1)\}$$

For $n = m+1$

In arithmetic operation (2), the circuit arrangement of FIG. 14 is the same as that of the fourth embodiment.

In arithmetic operation (1), by using (B1+B2)/2 and (B−1+B−2)/2 which are respectively the average values of the data of two succeeding pixels to the left and right of the joint section, data is proportionally distributed at inverted ratios with respect to the distances between the joint pixel and the central positions of the effective pixels to the right and left thereof, thereby obtaining the proportionally distributed data as the interpolation data. Arithmetic operation (2) is the same scheme as that of arithmetic operation (1), so that the gradient of the joint section can be smoothly corrected.

As a modification of FIG. 14, (q−2) registers are connected to the input of the shift register 61, and (q−2) shift registers are connected to the output of the shift register 64. The arithmetic circuit 65 performs the following arithmetic operation. The nth pixel interpolation data Cn is given as follows:

$$Cn = [(B1 + B2 + \ldots + Bq - 1) \cdot \{n + (p - 1)/2\}q + (B - 1 + B - 2 + \ldots + B - (p - 1)) \cdot \{m - n + 1 + (q - 1)/2\}/p]/\{m + 1(p - 1)/2 + (q - 1)/2\}$$

Term $\{n+(p-1)/2\}$ in the above equation represents the distance from the nth pixel in the joint section to the central position of the p left effective pixels, term $\{m-n+1+(q-1)/2\}$ represents the distance from the nth pixel to the central position of the q right effective pixels, and denominator $\{m+1+(p-1)/2+(q-1)/2\}$ is the distance up to the p preceding and q succeeding pixels of the joint. the length of the joint section is also considered.

Terms $(B1+B2+\ldots+Bq-1)/$ and $(B-1+B-2+\ldots+B-(p-1)/p$ are average values of q succeeding and p preceding data.

Figure 22:
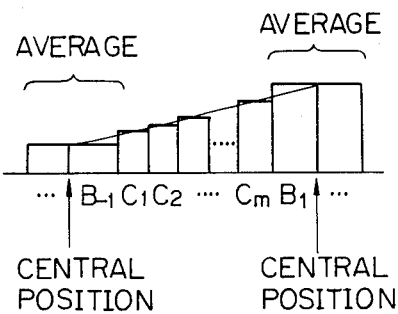

In this embodiment, the average values of the preceding and succeeding pixel image data of the joint of the plurality of pixels are calculated, and the joint interpolation image data Cn is obtained by proportionally distributing the joint interpolation image data Cn with inverted ratios of the distances up to the central positions of the plurality of pixels, thereby determining the image data of the joint section, as shown in FIG. 22.

According to the third to fifth embodiments as described above, when the line sensor is constituted by several sensor chips and even if the gaps between the adjacent chips are wide, correction can be performed. Therefore, an elongated sensor with joints can be easily used. In addition, since a plurality of reference pixels for correction is used, the resultant image is substantially free from noise or the like.

In a multi-value gradation level image signal, interpolation is performed for a joint section by interpolating analog data before conversion into digital data. Therefore, the scheme of the third to fifth embodiments is effective for preprocessing such as image processing.

In this manner, an omitted image data portion at the joint of the sensor chips can be smoothly restored. Even if the joint section consists of a plurality of pixels, a proper original image can be reproduced.

SIXTH EMBODIMENT

Another interpolation scheme for an inter-chip gap consisting of a plurality of pixels will be described in FIG. 15.

Figure 15:
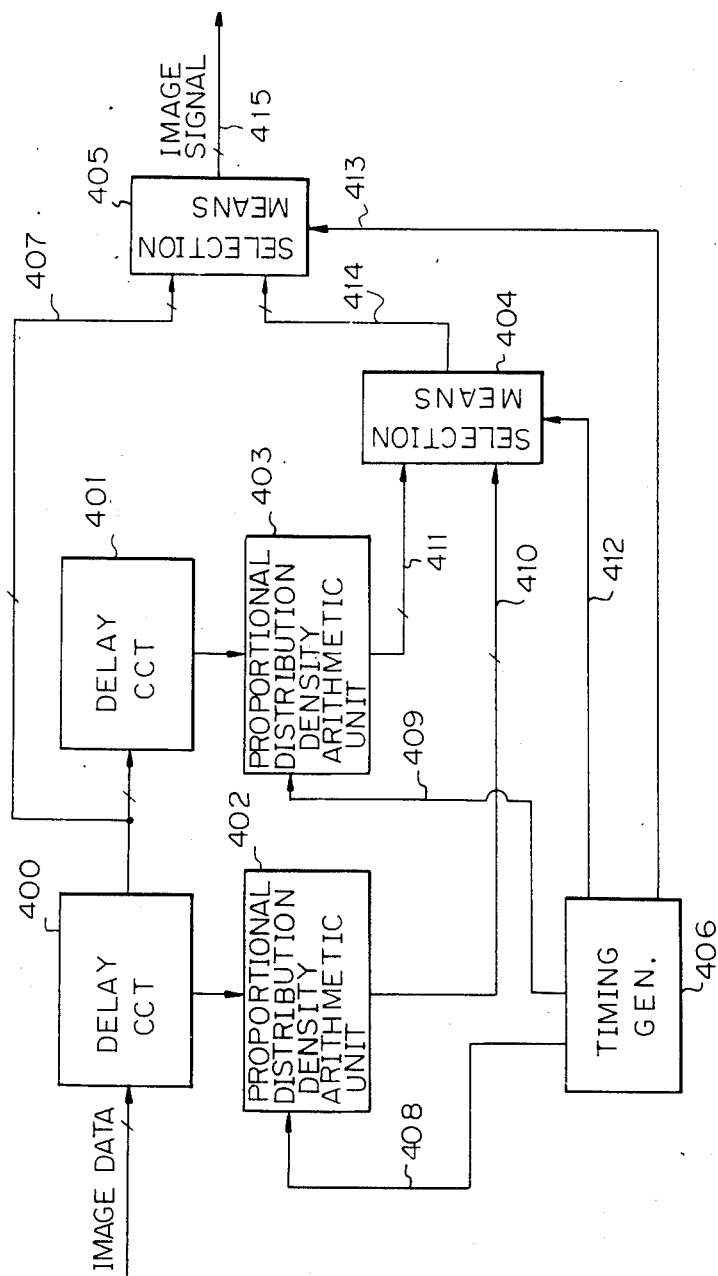
FIG. 15 is a block diagram showing a basic arrangement of an image data processor according to a sixth embodiment of the present invention.

Referring to FIG. 15, in a reading apparatus having an image input sensor consisting of a plurality of image pickup devices connected in line at intervals of at least one pixel, two effective pixel sections (each with at least one pixel) preceding and succeeding the joint are taken into consideration. The joint gap is divided at an inverse ratio to the two effective pixel lengths. A density proportional to a density gradient of an effective pixel section adjacent to the first half of the gap is used as interpolation pixel data for the first half of the gap. A density in proportion to the density gradient of the effective pixel section adjacent to the second half of the gap is used as the interpolation pixel data for the second half of the gap. By using these interpolation pixel data, the omitted image data at the joint is interpolated to properly reproduce the original image.

In order to achieve the above objective, an arrangement of the sixth embodiment is shown in FIG. 15. This circuit comprises delay circuits 400 and 401, proportion distribution density arithmetic units 402 and 403 for the delay circuits 400 and 401, image signal selecting means 404 and 405, and a timing generator 406.

In the above embodiment, the delay circuits 400 and 401 have first and second pixel lengths, respectively. The proportion distribution density arithmetic unit 402 calculates a density gradient on the basis of the first pixel length, and the proportion distribution density arithmetic unit 403 calculates a density gradient on the basis of the second pixel length. The timing generator 406 generates a timing signal 413 corresponding to a joint, and timing signals 408 and 409 obtained by proportionally distributing image data of the joint with the first and second pixel lengths and dividing the joint gap into halves. Therefore, the proportion distribution density arithmetic units 402 and 403 output pixel densities 410 and 411 proportional to the pixel positions of the gaps, respectively. The selecting means 404 selects the pixel density 410 or 411 at the divided pixel position in response to a timing signal 412 and outputs image data 414. The selecting means 405 selects the image data 414 from the selecting means 404 in response to the timing signal 413. Otherwise, the selecting means 405 selects an output 407 from the delay circuit 400. The selected signal appears as an image signal 415.

The above embodiment will be described in more detail hereinafter. FIG. 19A shows a structure of a line sensor used in the image reading apparatus of this embodiment. A line sensor 90 consists of a plurality of CCD solid-state image pickup devices (i.e., line sensor chips) 90-a, 90-b, and 90-C. A gap 91 between the solid-state image pickup devices has an m pixel width. An image signal obtained by scanning the line sensor 90 along the main scanning/subscanning direction for each scanning is a continuous signal shown in FIG. 19B. An image signal of m pixels at the joint is thus lost. As show in FIG. 19C, pixels (C1 to Cm) corresponding to the gap between the adjacent image pickup devices must therefore be interpolated.

Figure 16:
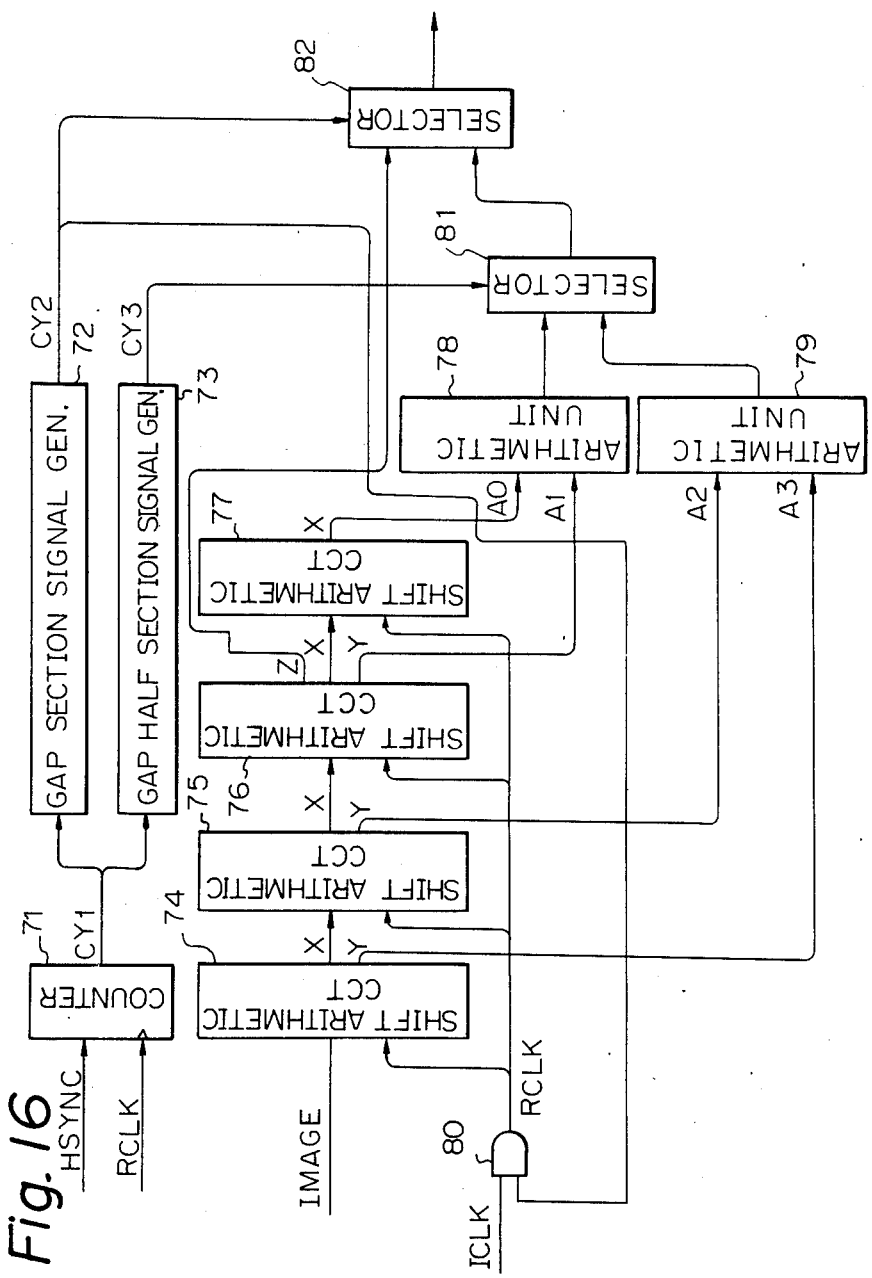
FIG. 16 is a block diagram of a circuit according to the sixth embodiment of the present invention.

A circuit for restoring (interpolating) the lost image data is shown in FIG. 16. Referring to FIG. 16, a counter 71 receives a signal RCLK as a clock input. The counter 71 is cleared in response to a horizontal sync signal HSYNC and is started. The counter 71 counts the number of pixels of the read image. The counter 71 generates an output $CY_1$ of logic "1" for one pixel duration at the end of the effective pixels of one chip. The output is set at logic "0" for the one-pixel duration in each gap.

A gap section signal generator 72 generates an output of logic "0" for a period corresponding to the gap section between the adjacent line sectors at the trailing edge of the signal $CY_1$. A gap half section signal generator 73 generates an output of logic "0" for a section of ½ of the pixels of the gap at the trailing edge of the signal $CY_1$.

Figure 17:
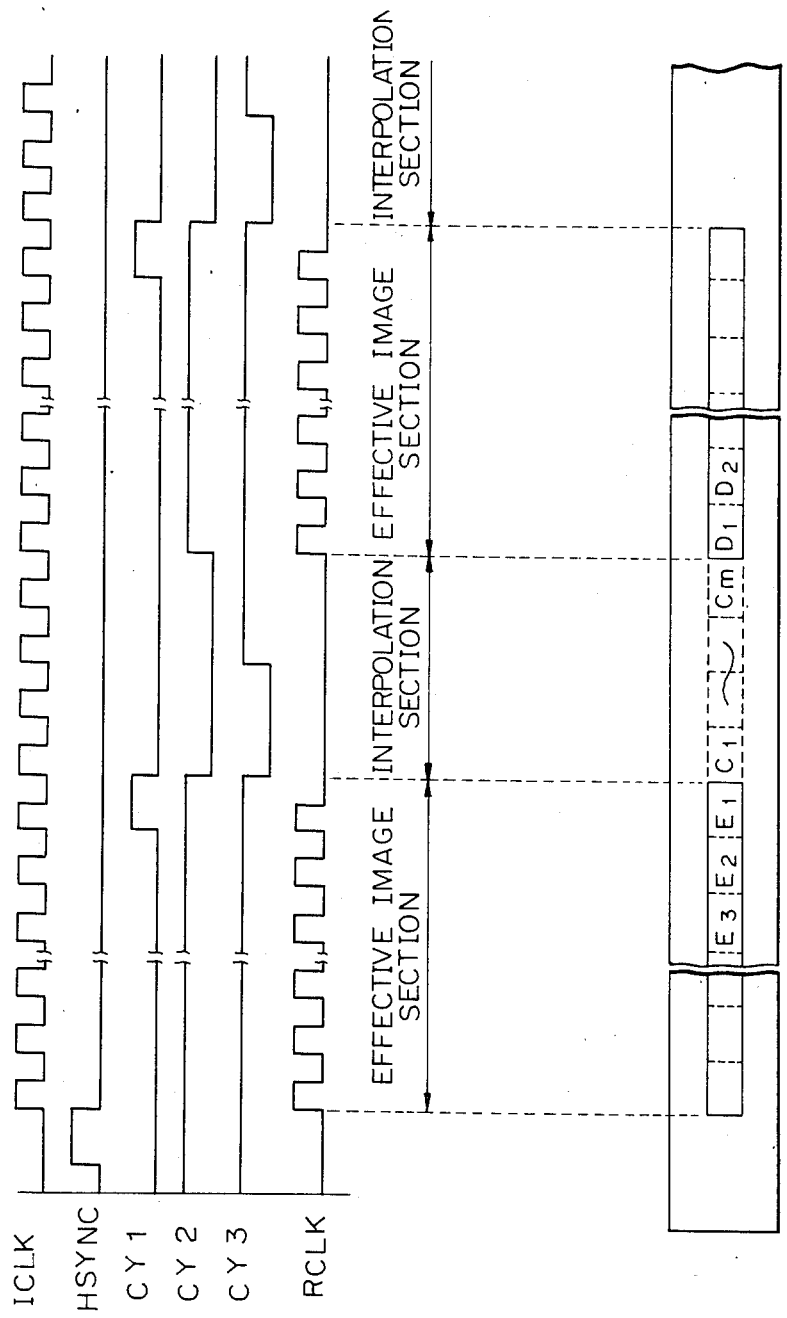
FIG. 17 is a timing chart for explaining the operation of the sixth embodiment of the present invention.

An output $CY_2$ from the gap section signal generator 72 is supplied to an AND gate 80. The AND gate 80 also receives an image transfer clock ICLK. The AND gate 80 outputs the signal RCLK only when the signal $CY_2$ is set at logic "1". Since the signal RCLK is input as clocks to the counter 71, the notice pixel is updated to E3, E2, and E1. At the gap timing, the signal RCLK is set at logic "0", and the counter 71 is stopped. The timing chart of these operations is shown in FIG. 17.

The clock signal RCLK is also input to shift arithmetic circuits 74, 75, 76 and 77. The counter 71 and a line sensor 90 are arranged such that an output Z from the shift arithmetic circuit 76 represents the "notice pixel". The image data IMAGE is sequentially shifted through the shift arithmetic circuits 74, 75, 76 and 77. When the notice pixel is updated to the position corresponding to the joint timing (i.e., $CY_2$="0"), the signal RCLK goes to logic "0" and data transfer (shifting) is stopped. The image data IMAGE is sequentially transferred to the shift arithmetic circuit 74, 75, 76 and 77, and simple arithmetic operations (to be described later) are performed. Outputs A3, A2, A1 and A0 appear at terminals Y of the shift arithmetic circuits 74, 75 and 76, and at an X terminal of the shift arithmetic circuit 77, respectively.

The internal arrangement of each of the shift arithmetic circuits 74, 75, 76 and 77 is shown in FIG. 18A. Each shift arithmetic circuit consists of R shift registers 83-1 to 83-R and an averaging circuit 86. The input image data is transferred to the shift registers 83-1 to 83-R in response to the signal RCLK and appears at a terminal X. The signal appearing at the terminal X is therefore the image data delayed by the R shift registers. The input image data is also delayed by only the shift register 83-1 in the shift arithmetic circuit and appears at a terminal Z.

Outputs from the shift registers 83-1 to 83-R in each shift arithmetic circuit are supplied to an adder 84 thereof. A sum signal from the adder 84 is multiplied with 1/R by a 1/R times multiplication cirucit 85. A value of an output from the circuit 85, i.e., an average value of the outputs from the shift registers 83-1 to 83-R appears at a terminal Y. The Y output corresponds to the outputs A3, A2, A1 and A0 from the shift arithmetic circuits 74, 75, 76 and 77.

The outputs A3 and A2 and the outputs A1 and A0 are supplied to arithmetic circuits 79 and 78 to calculate the values of the interpolation data. Outputs from the arithmetic circuits 78 and 79 are supplied to a selector 81. An output $CY_3$ from the interpolation half section signal generator 73 is supplied as a selection input to the selector 81. When the signal $CY_3$ is set at logic "0", the selector 81 selects the output from the arithmetic circuit 78. However, when the signal $CY_3$ is set at logic "1", the selector 81 selects the output from the arithmetic circuit 79. Either output is the correction value of the interpolation data. The operation of the arithmetic circuits 78 and 79 will be described later.

The notice pixel data appears at the terminal Z of the shift arithmetic circuit 76. The notice pixel date is supplied to a selector 82 and is selected thereby while the signal $CY_2$ from the gap interval signal generator 72 is set at logic "1". However, when the signal $CY_2$ is set at logic "0", i.e., at the gap timing, the output as the correction value from the selector 81 is selected by the selector 82. The image data calculated by the preceding and succeeding effective pixel data is used as the interpolation data for the gap interval.

In the above embodiment, the correction data value is corrected in accordance with the data level gradients of the preceding and succeeding image data of the gap. The correction values are calculated by the arithmetic circuit 78 and 79 and the selector 81. This correction will be briefly described below.

The gap is given as m pixels C1 to Cm, and R4, R5, R6 and R7 are given as the numbers of shift registers of the shift arithmetic circuits 74, 75, 76 and 77. The arithmetic operation of the arithmetic circuit 78 is performed as follows:

$$C_n = A1 + [2(A1-A0) \cdot \{(R6+1)/2 + n\}]/(R6+R7) \quad (1)$$
for n=1, ... m/2

Figure 20:
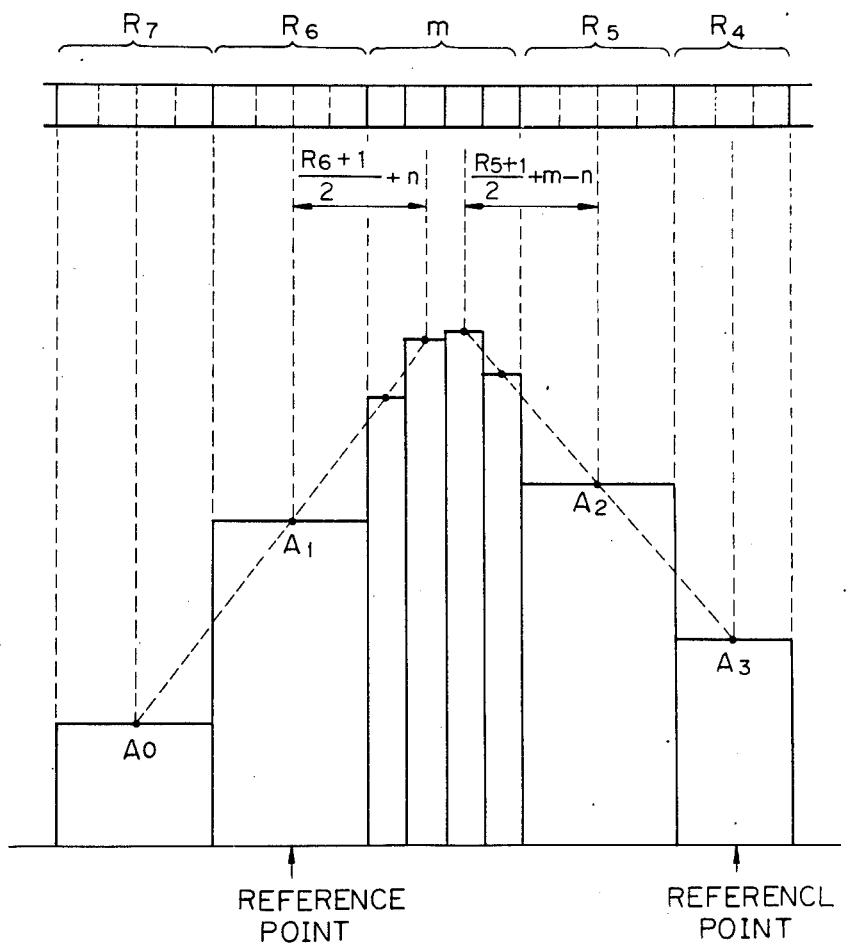
FIG. 20 is an imaginary chart when the gap data is interpolated.

The arithmetic operation of the arithmetic circuit 79 is given below:

$$C_n = A1 + [2(A2-A3) \cdot \{(R5+1)/2 + m-n\}]/(R4+R5) \quad (2)$$
for n=m/2+1, ... m where A0, A1, A2 and A3 are average data outputs from the terminals Y and X of the shift arithmetic circuits 77, 76, 75 and 74. As shown in FIG. 20, these are the average values of the R7, R6, R5 and R4 image data of the preceding and succeeding the m-pixel gap section.

As shown in FIG. 20, the first terms of equations (1) and (2) are data levels of the reference point. The second terms are differences between the reference data level and the image levels of pixels adjacent to the reference point. The difference is given as a product of the gradient, i.e., $2(A1-A0)/(R6+R7)$ or $2(A2-A3)/(R4+R5)$ and the distance from the gap to the reference point, i.e., $(R6+1)/2+n$ or $(R5+1)/2+m-n$. The difference is equivalent to line $y=b+ax$. The image data levels of the gap position can be estimated and determined according to data gradients of the preceding and succeeding pixels with respect to the gap. In order to prevent image data variations due to noise, the data gradients are determined using a plurality of preceding and succeeding pixels (i.e., R7, R6, R5 and R4).

A modification of calculation of the correction value will be described. If R=1 in FIG. 18A, i.e., if the number of shift registers is one, the circuit is simplified, as shown in FIG. 18B. If R7=R6=R5=R4=1, the gradient of the gap image data level can be calculated by the two preceding and succeeding pixels with respect to the gap, thereby calculating the gap data.

The arithmetic operation results of the arithmetic circuits 78 and 79 are selected by the selector 81 in response to the output $CY_3$ from the gap half section signal generator 73. For each half of the gap m pixels, the correction data is obtained by arithmetically oeprating the sensor image data adjecent the corresponding half.

According to the sixth embodiment as described above, the sensor comprises several chips, and image data correction can be made even if the joint gap is wide. As a result, an elongated sensor with joints can be easily used without any problems. Furthermore, the correction gradient and the data level are calculated according to the average value of a plurality of pixels. Therefore, the correction is free from noise or the like.

The joint image data is estimated and determined by the density or luminance level gradient of the preceding and succeeding effective image data with respect to the joint. Even if a thin line or the like overlays the joint, the original image can be restored to some extent according to the adjacent image data levels.

According to the sixth embodiment, the lost image data at the joint of the solid-state image pickup devices is restored. Even if the joint length corresponds to a width of a plurality of pixels, the original image can be properly reproduced. This embodiment is particularly effective when the original image is a line image.

What is claimed is:

1. An image reading apparatus comprising:
a plurality of line sensors for reading an original image and generating image data, each of said line sensors comprising plural photosensor elements and said line sensors being arranged to read a same line of the image on a share basis with a gap between two adjacent ones of said line sensors;
means for forming pseudo image data corresponding to the gap between two adjacent ones of said line sensors by using the image data of at least one pixel adjacent to the gap; and
means for inserting the pseudo image data formed by said forming means into a portion corresponding to the gap in the image data outputted from said plurality of line sensors.

2. An apparatus according to claim 1, wherein said plurality of line sensors are aligned in line on a substrate.

3. An apparatus according to claim 1, wherein said forming means forms the pseudo image data having average values of a plurality of image data preceding and succeeding the gap.

4. An apparatus according to claim 1, wherein said forming means forms the pseudo image data in accordance with change of a plurality of image data at least either preceding or succeeding the gap.

5. An apparatus according to claim 1, wherein said forming means forms pseudo image data equal to image data of at least one pixel adjacent to the gap.

6. An apparatus according to claim 1, wherein the gap between two adjacent ones of line sensors is a plurality of pixels of one, and said forming means forms a plurality of pseudo image data corresponding to the gap.

7. An apparatus according to claim 1, wherein said forming means has means for holding the image data of at least one pixel adjacent to the gap, and forms the pseudo image data corresponding to the gap, using the image data held by said holding means.

8. An apparatus according to claim 1, wherein said forming means forms the pseudo image data in accordance with difference between a plurality of image data preceding and succeeding the gap.

9. An image reading apparatus comprising:
a plurality of line sensors for reading an original image and generating image data, each of said line sensors comprising plural photosensor elements and said line sensors being arranged to read a same line of the image on a share basis with a gap between two adjacent ones of said line sensors;

means for forming pseudo image data corresponding to the gap between two adjacent ones of said line sensors in accordance with change in image density levels of a plurality of image data at least either preceding or succeeding the gap; and means for inserting the pseudo image data formed by said forming means into a portion corresponding to the gap in the image data outputted from said plurality of line sensors.

10. An apparatus according to claim 9, wherein said plurality of line sensors are aligned in line on a substrate.

11. An apparatus according to claim 9, further comprising means for detecting the change in image density levels of the plurality of image data at least either preceding or succeeding the gap.

12. An apparatus according to claim 9, wherein said forming means forms a plurality of pseudo image data in accordance with the changes in image density levels of the plurality of image data preceding and succeeding the gap.

13. An apparatus according to claim 9, wherein the gap between two adjacent ones of line sensors is a plurality of pixels of one, and said forming means forms a plurality of pseudo image data representing at least two different density levels.

14. An apparatus according to claim 9, wherein said forming means has means for holding a plurality of image data at least either preceding or succeeding the gap, and forms the pseudo image data corresponding to the gap, using the plurality of image data held by said holding means.

15. An image reading apparatus comprising:

a plurality of line sensors for reading an original image and generating image data, each of said line sensors comprising plural photosensor elements and said line sensors being arranged to read a same line of the image on a share basis with a gap consisting of a plurality of pixels between two adjacent ones of said line sensors;

means for forming a plurality of pseudo image data representing at least two different density levels corresponding to the gap between two adjacent ones of said line sensors in accordance with image data of at least one pixel adjacent to the gap; and means for inserting the pseudo image data formed by said forming means into a portion corresponding to the gap in the image data outputted from said plurality of line sensors.

16. An apparatus according to claim 15, wherein said plurality of line sensors are aligned in line on a substrate.

17. An apparatus according to claim 15, wherein said forming means forms the pseudo image data in accordance with change in image density levels of the plurality of image data at least either preceding or succeeding the gap.

18. An apparatus according to claim 15, wherein said forming means forms a plurality of pseudo image data representing different density levels corresponding to first and second halves of the gap.

19. An apparatus according to claim 15, wherein said forming means forms the plurality of pseudo image data in accordance with difference between a plurality of image data preceding and succeeding the gap.

20. An apparatus according to claim 15, wherein said forming means forms the plurality of pseudo image data in accordance with image data preceding the gap and image data succeeding the gap.

21. An apparatus according to claim 15, wherein said forming means has means for holding the image data of at least one pixel adjacent to the gap, and forms the plurality of pseudo image data corresponding to the gap, using the image data held by said holding means.

22. An image reading apparatus comprising:

a plurality of line sensors for reading an original image and generating image data, each of said line sensors comprising plural photosensor elements and said line sensors being arranged to read a same line of the image on a share basis with a gap between two adjacent ones of said line sensors;

means for forming pseudo image data corresponding to the gap between two adjacent ones of said line sensors in accordance with the image data preceding and succeeding the gap; and means for inserting the pseudo image data formed by said forming means into a portion corresponding to the gap in the image data outputted from said plurality of line sensors.

23. An apparatus according to claim 22, wherein said plurality of line sensors are aligned in line on a substrate.

24. An apparatus according to claim 22, wherein said forming means forms the pseudo image data having average value of a plurality of image data preceding and succeeding the gap.

25. An apparatus according to claim 22, wherein said forming means forms the pseudo image data in accordance with the changes in image density levels of a plurality of image data preceding and succeeding the gap.

26. An apparatus according to claim 22, wherein said forming means forms the pseudo iamge data in accordance with difference between a plurality of image data preceding and succeeding the gap.

27. An apparatus according to claim 22, wherein the gap between two adjacent ones of line sensors is a plurality of pixels of one, and said forming means forms a plurality of pseudo image data corresponding to the gap.

28. An apparatus according to claim 22, wherein said forming means has means for holding image data preceding and succeeding the gap, and forms the pseudo image data corresponding to the gap, using the image data held by said holding means.

* * * * *

UNITED STATES PATENT AND TRADEMARK OFFICE
CERTIFICATE OF CORRECTION

PATENT NO. : 4,776,031
DATED : October 4, 1988
INVENTOR(S) : YOSHINOBU MITA

Page 1 of 3

It is certified that error appears in the above-identified patent and that said Letters Patent is hereby corrected as shown below:

IN THE DRAWINGS

Sheet 16, Figure 20,
    "REFERENCL" should read --REFERENCE--.
      POINT                    POINT

COLUMN 1

Line 36, "fomred." should read --formed--.

COLUMN 2

Line 4, "FIG.3" should read --FIG. 3--.
    Line 47, "interpolated," should read --interpolated;--.
    Line 66, "lens 124" should read --lens 126--.

COLUMN 3

Line 10, "CCD line sensor 27" should read --CCD line sensor 127--.
    Line 24, "125" should read --135--.
    Line 60, "as" should read --has--.
    Line 68, "data"," should read --data".--.

COLUMN 4

Line 9, "an A/D converter 3 to image data of a" should be deleted.
    Line 10, "plurality of bits" should be deleted.
    Line 32, "an the" should read --as the--.
    Line 49, "signal HYSYNC." should read --signal HSYNC.--.

UNITED STATES PATENT AND TRADEMARK OFFICE
CERTIFICATE OF CORRECTION

PATENT NO. : 4,776,031
DATED : October 4, 1988
INVENTOR(S) : YOSHINOBU MITA

It is certified that error appears in the above-identified patent and that said Letters Patent is hereby corrected as shown below:

COLUMN 7

Line 20, "generaor 306" should read --generator 306--.
Line 21, "notic" should read --notice--.
Line 22, "notic" should read --notice--.
Line 50, "notic" should read --notice--.

COLUMN 8

Line 5, "notic" should read --notice--.
Line 7, "notic" should read --notice--.
Line 14, "notic" should read --notice--.
Line 15, "notic" should read --notice--.
Line 17, "notic" should read --notice--.
Line 19, "notic" should read --notice--.
Line 25, "the" should read --The--.
Line 27, "The output from the" should be deleted.
Line 28, "half section signal generator 48." should be deleted.
Line 63, "pixels" should read --pixel--.

COLUMN 9

Line 6, "notic" should read --notice--.
Line 19, "A" should read --As--.
Line 52, "notic" should read --notice--.

COLUMN 10

Line 37, "the" (second occurrence) should read --The--.
Line 40, ". . +B-(p-1)/p" should read --. . +B-(p-1)/p--.

UNITED STATES PATENT AND TRADEMARK OFFICE
CERTIFICATE OF CORRECTION

PATENT NO. : 4,776,031
DATED : October 4, 1988
INVENTOR(S) : YOSHINOBU MITA

Page 3 of 3

It is certified that error appears in the above-identified patent and that said Letters Patent is hereby corrected as shown below:

COLUMN 11

Line 60, "show" should read --shown--.

COLUMN 12

Line 52, "cirucit" should read --circuit--.

COLUMN 13

Line 68, "oeprat-" should read --operat- --.

COLUMN 14

Line 1, "adjecent" should read --adjacent--.

COLUMN 16

Line 47, "iamge" should read --image--.

Signed and Sealed this

Ninth Day of May, 1989

Attest:

DONALD J. QUIGG

Attesting Officer     Commissioner of Patents and Trademarks